United States Patent
Fujii et al.

(10) Patent No.: US 6,648,168 B2
(45) Date of Patent: Nov. 18, 2003

(54) INSULATED CONTAINER

(75) Inventors: Takafumi Fujii, Niigata (JP); Eiji Otsuka, Shanghai (CN)

(73) Assignee: Nippon Sanso Corporation (JP)

( * ) Notice: Subject to any disclaimer, the term of this patent is extended or adjusted under 35 U.S.C. 154(b) by 0 days.

(21) Appl. No.: 10/362,424

(22) PCT Filed: Aug. 28, 2001

(86) PCT No.: PCT/JP01/07361

§ 371 (c)(1),
(2), (4) Date: Feb. 25, 2003

(87) PCT Pub. No.: WO02/18232

PCT Pub. Date: Mar. 7, 2002

(65) Prior Publication Data

US 2003/0168459 A1 Sep. 11, 2003

(30) Foreign Application Priority Data

Aug. 30, 2000  (JP) ........................................ 2000-261956

(51) Int. Cl.⁷ ............................................... A47J 39/00
(52) U.S. Cl. ............................ 220/592.21; 220/592.27; 220/592.28
(58) Field of Search .......................... 220/592.2, 592.21, 220/592.27, 592.28

(56) References Cited

U.S. PATENT DOCUMENTS 3,410,443 A * 11/1968 Hofmann ............... 220/592.21
5,168,793 A * 12/1992 Padamsee .................... 99/279
5,314,086 A * 5/1994 Short ..................... 220/592.16
5,316,171 A * 5/1994 Danner et al. .......... 220/592.21
5,678,725 A * 10/1997 Yamada et al. ......... 220/592.21

FOREIGN PATENT DOCUMENTS

| JP | 52-46528 | 11/1977 |
| JP | 53-12228 | 4/1978 |
| JP | 56-46553 B2 | 11/1981 |
| JP | 60-210220 A | 10/1985 |
| JP | 2000-060743 | 2/2000 |
| JP | 2001-505088 A | 4/2001 |
| WO | WO 98/18374 A1 | 5/1998 |

* cited by examiner

Primary Examiner—Joseph M. Moy
(74) Attorney, Agent, or Firm—Burns, Doane, Swecker & Mathis, LLP

(57) ABSTRACT

The inner container and outer container which are formed from a transparent material are integrally formed leaving a space section therebetween, a thermally insulating layer is formed in the space section, and a radiation prevention film is formed on at least one of an outer surface of the inner container and an inner surface of the outer container. The radiation prevention film has a radiation prevention film omission section having a surface area which is 30% or less of the surface of the container on which the radiation prevention film is formed.

6 Claims, 3 Drawing Sheets

INSULATED CONTAINER

TECHNICAL FIELD

The present invention relates to a thermally insulated container having a double-walled structure in which an inner container and an outer container are integrally joined leaving a space therebetween, and in particular, the present invention relates to a thermally insulated container in which a radiation prevention film is formed on at least one of the outer surface of the inner container or the inner surface of the outer container.

BACKGROUND ART

In recent years, thermally insulated metal containers having inner and outer containers made from metals such as stainless steel have been widely used in place of conventionally used glass vacuum flasks (hereinafter, referred to as "thermally insulated containers"). Because thermally insulated metal containers are superior from the point of view of strength, they are suitable for portable use.

Thermally insulated containers made from metal are made by arranging an inner container and an outer container, which are made of a metal such as stainless steel, leaving a space section in between and joining the opening sections thereof to form an integrated double walled container, and the space section is used to form a thermally insulating layer. In particular, thermally insulated metal vacuum flasks in which the space section is evacuated to form a thermally insulating vacuum layer are used generally as thermally insulated containers whose temperature maintaining performance is excellent.

However, in the above-mentioned thermally insulated metal vacuum container, since the inner and outer containers are metal, which is not transparent, it is not possible to check the quantity of the contents and the like from the outside, and in order to do this, it is necessary to remove the lid or the stopper, and check the inside of the container through the opening.

When checking the inside of the container, external air flows into the inside of the container. Therefore, when cold drink, for example, is contained in the container, the temperature of the drink increases to due to the inflow of air. In addition, when a hot drink such as hot water or the like is contained in the container, the temperature of the drink falls.

For this reason, the temperature maintaining performance of the conventional thermally insulated container was degraded.

In addition, with the above-mentioned thermally insulated glass containers, in order to prevent thermal radiation and to increase the temperature maintaining properties, it is common for a silver-plating film to be formed by means of a silver mirror reaction on the thermally insulating layer side of the inner or outer container. In this case, it is impossible to check the contents of the container from the outside. Therefore, in the same way as for the above-mentioned thermally insulated metal containers, there is a problem that maintenance of the temperature of the contents of the container is insufficient.

In addition, in Japanese Unexamined Patent Application, First Publication No. 2000-60743, a thermally insulated container in which a transparent synthetic resin is used for the inner and outer containers is disclosed.

In this thermally insulated container, a thermally insulating layer is formed in which a gas having a thermal conductivity lower than air (hereinafter, referred to as low thermal conductivity gas), such as krypton, xenon, and argon, is enclosed within the space section.

In this thermally insulated container, to prevent thermal radiation, a radiation prevention film through which visible light can pass and which absorbs or reflects infrared radiation is provided on the surface of the thermally insulating layer side of the inner or outer container.

The radiation prevention film is formed by adhering a metal oxide, a metal nitride, or fine particles of metal on a film substrate in a single layer or a multilayer by means of the vapor deposition, sputtering, ion plating, or the like.

With this thermally insulated container, since a radiation prevention film through which visible light can pass is used, it is possible to check the contents of the container from the outside through the radiation prevention film.

However, since the radiation prevention film used in this thermally insulated container has a high rigidity, it is difficult to form curved surfaces.

For this reason, it can be arranged on places such as flat sections, and sections which are broadly flat (such as the body of cylindrical sections), but arrangement on sections which are formed of curved surfaces such as the shoulders or bottoms of the container, or the like, is difficult.

In consideration of the above-mentioned circumstances, the present invention has an object of providing a thermally insulated container with which it is possible to visually inspect the contents, or the like, contained within the container, which has superior temperature maintaining performance, and which can be given an improved radiation prevention function by providing a radiation preventing performance on parts of the container which have curved surfaces as well as parts of the container which have flat surfaces.

DISCLOSURE OF INVENTION

The thermally insulated container according to a first aspect of the present invention comprises an inner container and an outer container formed of a transparent material which are arranged leaving a space section therebetween, and which are integrally joined to form a double walled container, wherein the space section between the above-mentioned inner and outer containers of the double walled container forms a thermally insulating layer, and a radiation prevention film is formed on at least one of the outer surface of the inner container and the inner surface of the outer container. The radiation prevention film has a radiation prevention film omission section having an area which is 30% or less of the container surface on which the radiation prevention film is formed.

In the thermally insulated container, the transparent material may be glass.

In the thermally insulated container, the transparent material may be synthetic resin.

In the thermally insulated container, the thermally insulating layer may be a vacuum insulation layer.

In the thermally insulated container, the thermally insulating layer may enclose a low thermal conductivity gas.

In the thermally insulated container, the radiation prevention film omission section may be formed in a slit shape in the axial direction of the container.

BEST MODE FOR CARRYING OUT THE INVENTION

Figure 1:
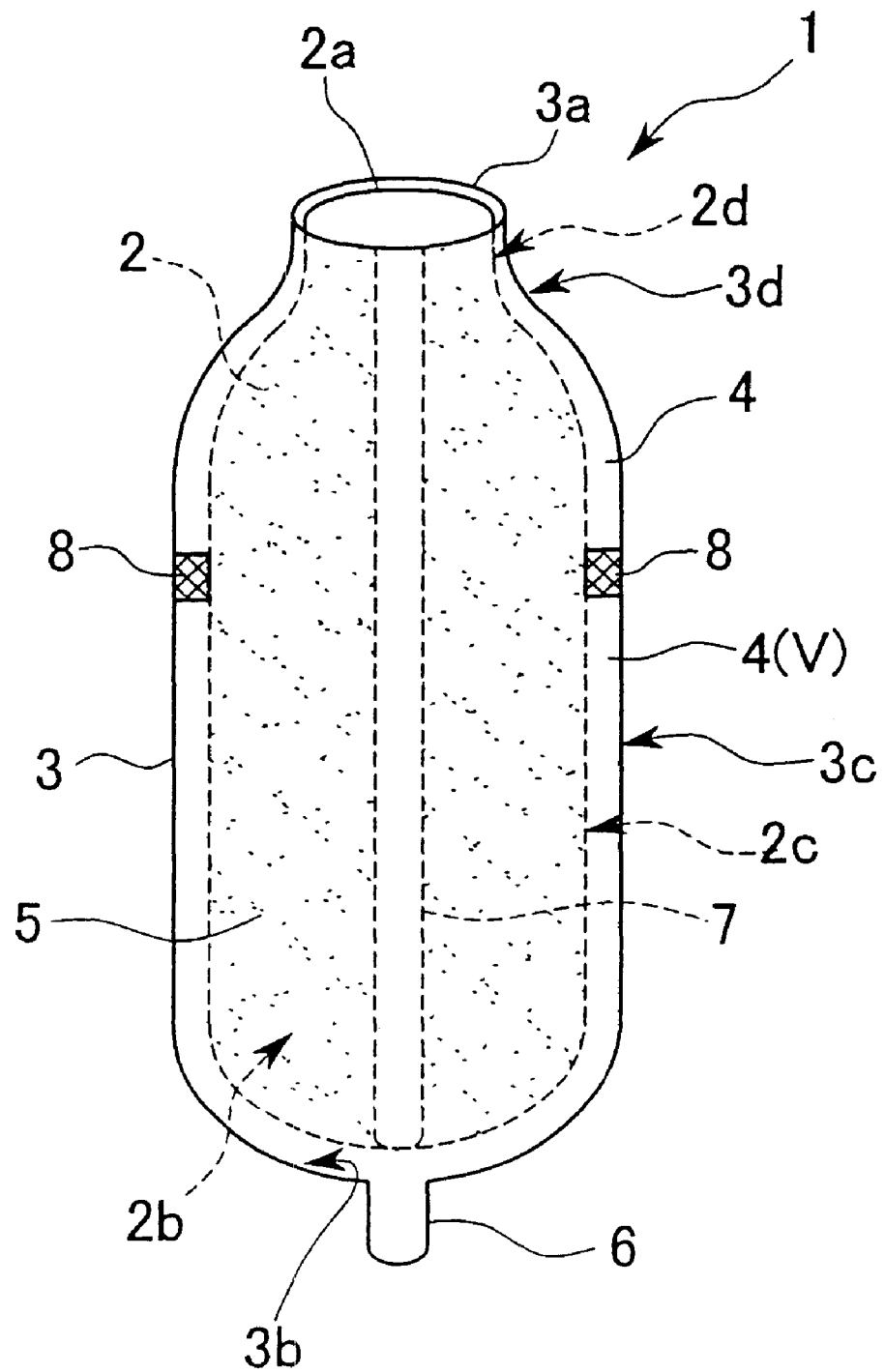
FIG. 1 is a perspective view showing an example of the thermally insulated container of the present invention.

An embodiment of the thermally insulated container of the present invention will be explained with reference to FIG. 1. FIG. 1 shows a thermally insulated vacuum container made from glass as an example of the thermally insulated container of the present invention.

The thermally insulated container 1 shown here comprises a glass inner container 2 and a glass outer container 3. These inner and outer containers 2 and 3 are formed having cylindrical shaped body sections 2c and 3c, and neck sections 2d and 3d having diameters smaller than those of the body sections 2c and 3c formed in the upper sections of the body sections 2c and 3c.

The inner container 2 and the outer container 3 are arranged leaving a space section 4 therebetween, and the rim sections 2a and 3a of each opening are integrally joined, and thereby a double-walled container is formed. The space section 4 is vacuum evacuated to form a thermally insulating vacuum layer V.

A radiation prevention film 5 is formed on at least one of the surfaces on the space section 4 (thermally insulating vacuum layer V) side of the inner container 2 and the outer container 3, in other words, the outer surface 2b of the inner container or the inner surface 3b of the outer container. In the example shown in the figure, the radiation prevention film 5 is only formed on the outer surface 2b of the inner container, and a radiation prevention film 5 is not formed on the inner surface 3b of the outer container.

This radiation prevention film 5 may be formed only on the inner surface 3b of the outer container, or it may be formed on both of the outer surface 2b of the inner container and the inner surface 3b of the outer container. In addition, a tip tube 6 for vacuum evacuation or for gas substitution is provided at the bottom of the outer container 3.

As the radiation prevention film 5, metal films comprising gold, silver, copper, nickel, aluminum or the like can be used.

The radiation prevention film 5 is preferably formed by means of a chemical plating method (such as silver mirror reaction), a vapor deposition method, a sputtering method, an ion plating method, a sol-gel method, a spray coating method, a dip coat method, or the like. In addition, a metal foil comprising aluminum or the like is also suitable.

When the thickness of the radiation prevention film 5 is 500 Å or greater (50 nm or greater), a superior radiation prevention function can be obtained, and in particular, when the thickness of the radiation prevention film 5 is 1000 Å or greater (100 nm or greater), an even more superior radiation prevention action can be obtained.

The radiation prevention film 5 has a radiation prevention film omission section 7 from which a portion of the radiation prevention film 5 has been omitted.

The radiation prevention film omission section 7 is formed in a slit shape in the axial direction of the inner container 2, and thereby, it is possible to check from the outside the contents housed within the inner container 2.

The radiation prevention film omission section 7 is formed to have a width that is approximately fixed from the rim section 2a of the opening of the inner container 2 to the bottom of the inner container 2.

The radiation prevention film omission section 7 is formed so as to have surface area which is 30% or less of the surface of the container on which the radiation prevention film 5 is formed. In the illustrated example, the surface area of the radiation prevention film omission section 7 is set so as to be 30% or less than the surface area of the outer surface 2b of the inner container.

When the area of the radiation prevention film omission section 7 is set so as to exceed 30% of the surface area of the outer surface 2b of the inner container, the radiation prevention effect is degraded and the temperature maintaining properties are degraded.

A lower limit for the surface area of the radiation prevention film omission section need not be set, and as long as it is formed so that it is possible to check from the outside the contents housed within the inner container 2. The surface area of the radiation prevention film omission section 7 can be suitably selected depending on the mode of use, but a surface area therefor of 5% or greater is preferable.

In forming the radiation prevention film 5, a method can be adopted in which a suitable masking material is arranged on the outer surface 2b of the inner container at the place at which the radiation prevention film omission section 7 is to be formed. Thereafter, a chemical plating method (such as silver mirror reaction), vapor deposition method, sputtering method, ion plating method, sol-gel method, spray coating method, or dip coat method is carried out on the outer surface 2b of the inner container, and then the above-mentioned masking material is removed.

In addition, the radiation prevention film 5 can be formed by means of a method in which a metal foil in which an omitted section which forms the radiation prevention film omission section 7 is formed in advance is adhered to the outer surface 2b of the inner container.

In the above-mentioned thermally insulated container 1, the space section 4 between the inner and outer containers 2 and 3 forms a thermally insulating vacuum layer V which has been vacuum evacuated. However, it is also possible to obtain superior insulation effects when the thermally insulating layer V is formed by enclosing a low thermal conductivity gas, such as krypton gas, xenon gas, argon gas, or the like, in the space section 4.

In the above-mentioned thermally insulated container 1, glass was used as the transparent material which forms the inner and outer containers 2 and 3. However, in the present invention synthetic resin can also be used as the transparent material.

In that situation, it is preferable to make the thermally insulating layer V by enclosing a low thermal conductivity gas such as krypton gas, xenon gas, argon gas, or the like, in the space section 4.

In addition, as the radiation prevention film 5, metal film of gold, silver, copper, nickel, aluminum, or the like can be used. The radiation prevention film 5 is preferably formed by means of a chemical plating method (such as silver mirror reaction), a vapor deposition method, a sputtering method, an ion plating method, a sol-gel method, a spray coating method, or a dip coat method. In particular, a radiation prevention film obtained using a magnetron sputtering process method is preferable.

Figure 2:
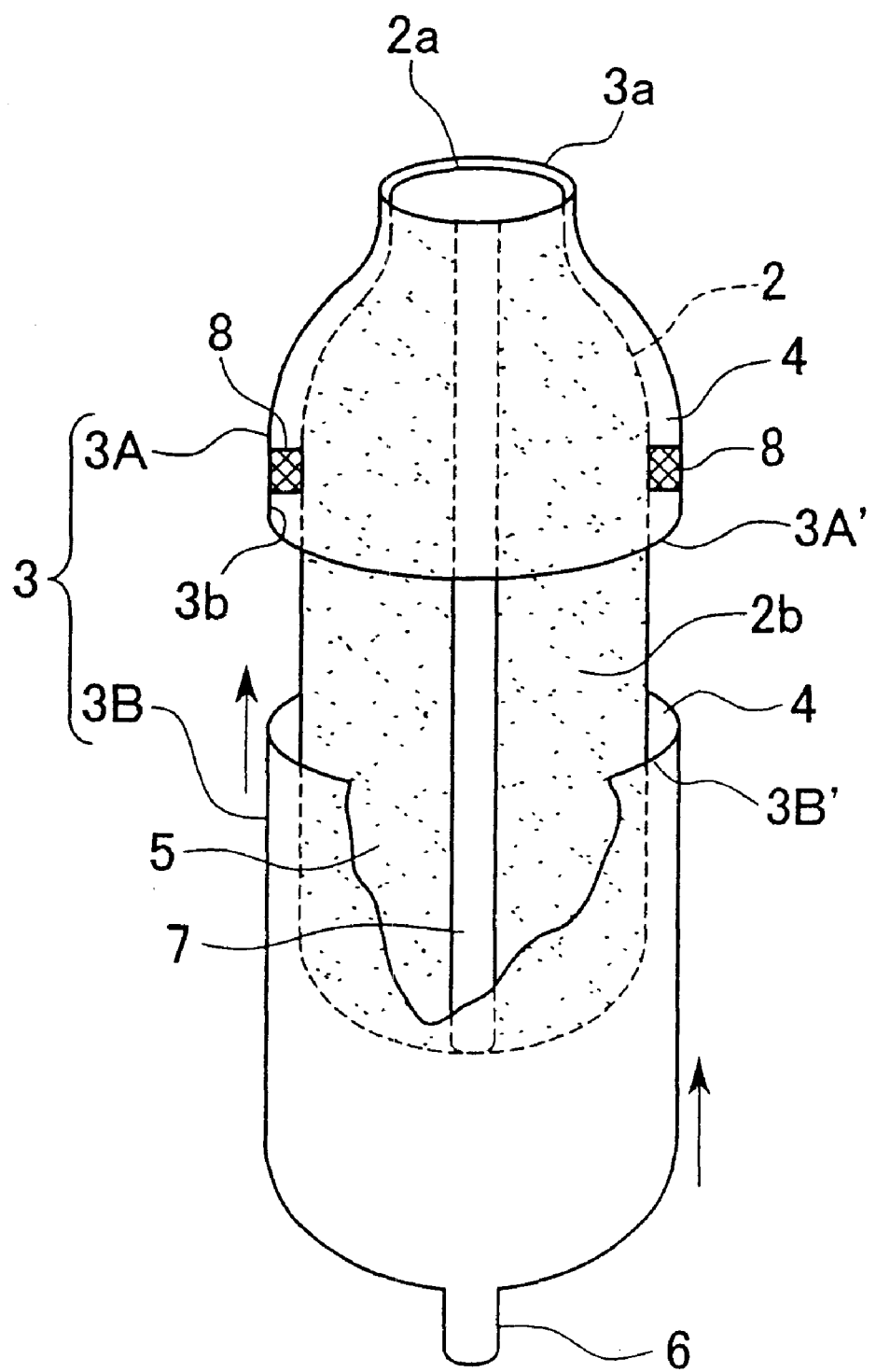
FIG. 2 is an explanatory diagram for explaining the manufacturing method of the thermally insulated container shown in FIG. 1.

In the following, a method for manufacturing the thermally insulated glass vacuum container 1 shown in FIG. 1 will be explained with reference to FIG. 2.

Manufacture of the Inner and Outer Containers

Firstly, the inner container 2 is fabricated. In addition, an outer container 3 having a shape approximately the same as the inner container 2 is fabricated. The outer container 3 is formed with dimensions sufficient to house the inner container 2 leaving a space section 4 therebetween.

The outer container 3 is divided into an upper outer container 3A having an opening rim section 3a, and a lower outer container 3B having a tip tube 6 for gas evacuation of the bottom section.

Formation of the Radiation Prevention Film

The radiation prevention film 5 is formed by attaching a masking tape to the outer surface 2b of the inner container on the portion on which the radiation prevention film omission section 7 is to be formed, and then using a the chemical plating method (such as silver mirror reaction), vapor deposition method, sputtering method, ion plating method, sol-gel method, spray coating method, dip coat method, or the like.

Next, the masking tape is removed and the radiation prevention film 5 is formed with this portion being the radiation prevention film omission section 7.

Assembly of the Inner and Outer Containers

The upper part of the inner container 2 is housed,within the upper outer container 3A, and the opening rim section 2a and the opening rim section 3a are air tightly bonded to each other.

At this time, a pad 8 is positioned between the inner container 2 and the upper outer container 3A so as a space section 4 having a constant width is formed between these containers.

Next, the lower part of the inner container 2 is housed within the lower outer container 3B. At this time, a space section 4 is formed between the inner container 2 and the lower outer container 3B.

Next, the lower edge (joining section 3A') of the upper outer container 3A and the upper edge Joining section 3B') of the lower outer container 3B are bonded by welding, and thereby the upper outer container 3A and the lower outer container 3B are unified to form a double-walled container.

Vacuum Evacuation and Sealing

Finally, the space section 4 is vacuum evacuated via the tip tube 6 for evacuation until a prescribed vacuum (for example, $133.3 \times 10^{-3}$ Pa or less) is reached. Then, the tip tube 6 for evacuation is welded and sealed, thereby forming the thermally insulating vacuum layer V in space section 4.

When a thermally insulated container is manufactured using inner and outer containers 2 and 3 which are made from a synthetic resin material, the joining of the upper outer container 3A and the lower outer container 3B may be carried out using an adhesive agent, an ultra-sonic welder, or the like.

When a synthetic resin material is used, if the thermally insulating layer is formed by substitution with a gas having low thermal conductivity such as krypton gas, xenon gas, argon gas, or the like, and then enclosing this gas having low thermal conductivity in the space section 4, it becomes possible for the thermally insulating properties to be maintained over a long period of time.

In the above-mentioned thermally insulated container 1, since the radiation prevention film 5 has a radiation prevention film omission section 7, it is possible to check the contents within the inner container 2 through the radiation prevention film omission section 7.

For this reason, when checking the contents, there is no need to open the opening section by removing the lid or the like, and it is possible to avoid changes to the temperature of the contents due to external air.

In addition, in the thermally insulated container 1, since the radiation prevention film 5 has a radiation prevention film omission section 7, it is possible to increase the thermal insulation performance compared with a thermally insulated container having a radiation prevention film 5 in which a radiation prevention film omission section is not formed.

Consequently, it is possible to improve the temperature maintaining properties.

In addition, by means of forming a radiation prevention film 7, it is possible to reduce the amount of metal used in the radiation prevention film 5, and thereby it is possible to reduce costs.

In addition, by means of forming the radiation prevention film omission section 7 in the shape of a slit in the axial direction of the inner container 2, it is possible to check the contents of the container regardless of the position of the axial direction (for example, the position of the height of the water surface) of the contents.

Consequently, irrespective of the quantity of the contents, it is possible to check with certainty the contents and the amount of the contents.

In addition, in the thermally insulated container 5, since it is possible to form the radiation prevention film 5 by means of a chemical plating method, a vapor deposition method, a sputtering method, an ion plating method, a sol-gel method, a spray coating method, a dip coat method, or the like, it is possible to form the radiation prevention film 5 on any shaped container surface, such as spherical surfaces, curved surfaces, angular surfaces, without limitation to flat surfaces.

For this reason, even when the outer surface of the inner container 2b is a curved surface, it is possible to provide the radiation prevention film 5 and to obtain a superior temperature maintaining performance.

In addition, when the radiation prevention film 5 is formed by means of a vapor deposition method or the like, by means of forming the film with the bottom of the inner container 2 directed toward the vapor deposition source, it is possible to make the radiation prevention film 5 thicker in the vicinity of the bottom of the inner container 2, and gradually thinner toward the opening section.

In this situation, it is possible to obtain a thermally insulated container 1 having a superior external appearance.

In addition, by means of carrying out the vapor deposition in a condition with the side surface of the inner container 2 toward the vapor deposition source, it is possible to form the radiation prevention film 5 so that it is thicker at a prescribed circumferential position of the side surface of the inner container, and gradually thinner in the circumferential direction.

For example, by means of conducting the vapor deposition on the above-mentioned side surface of the inner container at three different places at circumferential positions separated by 120°, it is possible to form the radiation prevention film 5 so that it is thick at the three different circumferential positions and thin at other places.

For this reason, it is possible to present a striped pattern, and thereby to obtain a thermally insulated container which is superior from the point of view of its external appearance.

In addition, it is possible use the thermally insulated container of the present invention with its strength increased by covering the outer container with a protective cover. This thermally insulated container is suitable for portable use.

In addition, the insulated container of the present invention can also be used as table-top container.

TEST EXAMPLE 1

Glass thermally insulated vacuum containers as shown in FIG. 1 were prepared as follows.

Inner container 2 and outer container 3 were manufactured using borosilicate glass and using a blowing machine.

A thermally insulated container 1 was manufactured using the inner container 2 and the outer container 3 following the above-described manufacturing method.

The specifications of the thermally insulated containers are shown below.

Inner Container 2

Wall thickness: approximately 1.5 mm; outer diameter of the opening rim section 2a: 38 mm; total height: 210 mm; external diameter of the body: 90.0 mm; total surface area 580 cm$^2$.

Upper Outer Container 3A

Wall thickness: approximately 1.5 mm; inner diameter of the opening rim section 3a: 44.8 mm; total height: 80 mm; inner diameter of the body: 99.8 mm.

Lower Outer Container 3B

Wall thickness: approximately 1.5.mm; inner diameter of the body: 99.8 mm; total height: 139 mm.

Radiation Prevention Film 5

The radiation prevention film 5 was formed by means of attaching aluminum foil to the outer surface 2b of the inner container.

As the aluminum foil, aluminum foil having an omission section (radiation prevention film omission section 7) in the form of a slit extending in the axial direction of the container was used. The ratios (the omission ratios) of the surface areas of the omission sections to the surface areas of the outer surfaces 2b of the inner containers were as follows.

Omission Ratios: 5%, 10%, 20%, and 30%.

In addition, a thermally insulated container which did not have a radiation prevention film 5 was also made. This thermally insulated container corresponds to an omission ratio of 100%.

In addition, a thermally insulated container which did not have a radiation prevention film omission section 7 formed in the radiation prevention film 5 was made. This thermally insulated container corresponds to an omission ratio of 0%.

The Thermally Insulating Layer V

After vacuum evacuation of the space section 4, krypton gas, which is a low thermal conductivity gas, was charged into the space section 4 to a pressure roughly equal to atmospheric pressure or slight higher, and the tip tube 6 for evacuation was sealed.

Figure 3:
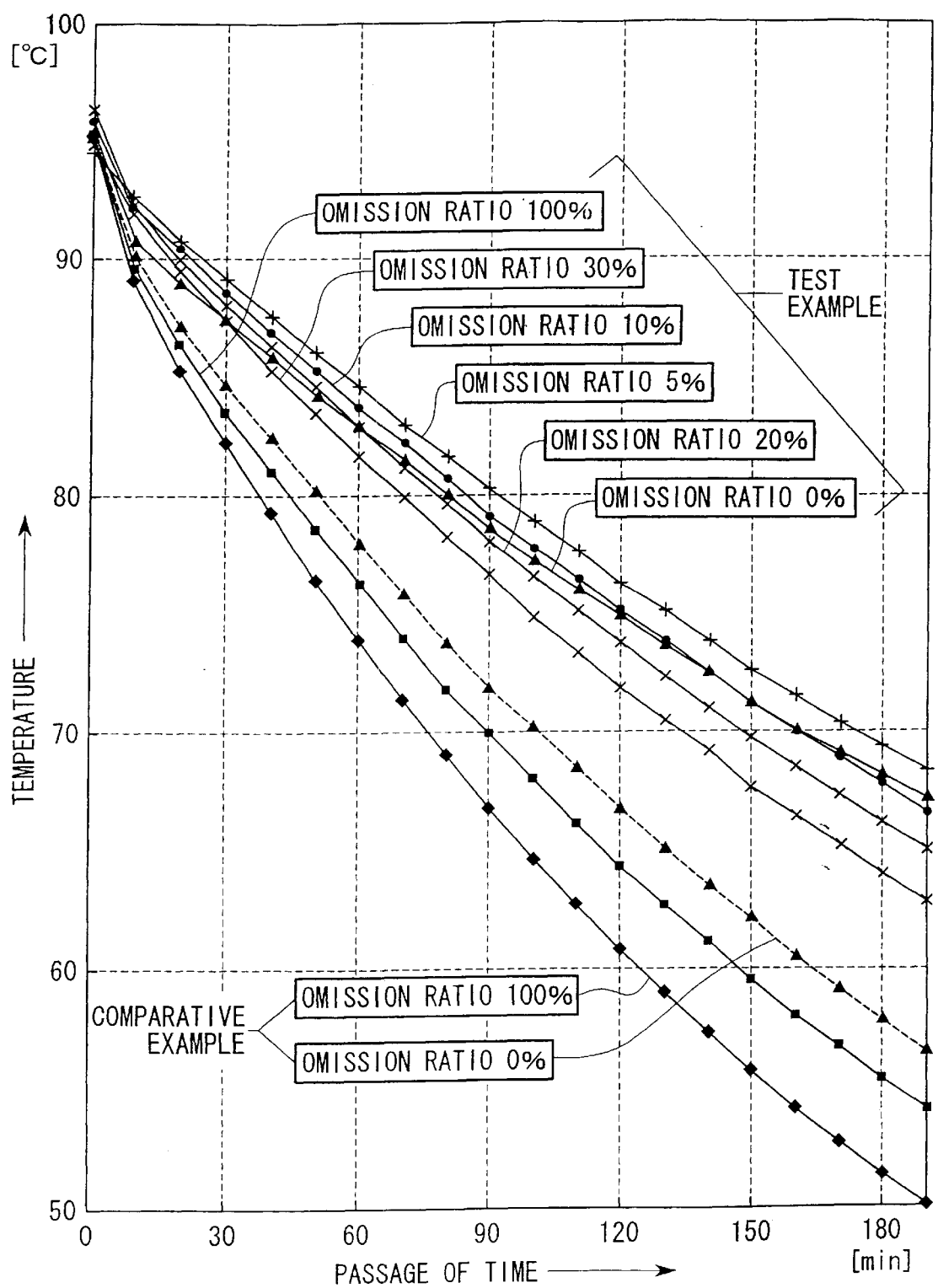
FIG. 3 is a graph showing the relationship between the surface area of the radiation prevention film omission section and the temperature maintaining performance of the thermally insulated container.

1000 cc of hot water of approximately 100° C. was put into each of these six thermally insulated containers for which the surface area of the radiation prevention film omission section 7 was different, and then the thermally insulated containers were left in a constant temperature room at 25° C. for three hours. FIG. 3 shows the change in temperature for this case. In FIG. 3, the horizontal axis shows the passage of time (minutes), and the vertical axis shows the temperature (° C.) of the water within the container.

COMPARATIVE EXAMPLE

Thermally insulated containers were manufactured with the space section 4 filled with air without vacuum evacuation of the space section 4 or filling with krypton gas.

The radiation prevention film 5 was formed by means of attaching aluminum foil in which an omission section (radiation prevention film omission section 7) had not been formed (omission ratio of 0%) to the outer surface 2b of the inner container.

In addition, a thermally insulated container was manufactured in which a radiation prevention film 5 was not formed. This thermally insulated container corresponded to an omission section ratio of 100%.

1000 cc of hot water of approximately 100° C. was put into each of these two thermally insulated containers, and then the thermally insulated containers were left in a constant temperature room at 25° C. for three hours. FIG. 3 shows the change in temperature for this case.

From FIG. 3, the following matters can be confirmed.
(1) The thermally insulated container comprising a radiation prevention film 5 having a radiation prevention film omission section 7 with an omission ratio of 5% has a superior temperature maintaining property up to three hours from the start of the test compared with a thermally insulated container having a radiation prevention film 5 formed over the entirety of the outer surface 2b of the inner container (omission ratio of 0%).
(2) The thermally insulated container comprising a radiation prevention film 5 having a radiation prevention film omission section 7 with an omission ratio of 10% has a superior temperature maintaining property up to 2 hours and 30 minutes from the start of the test compared with the thermally insulated container having an omission ratio of 0%.
(3) It was confirmed that the thermally insulated container comprising a radiation prevention film 5 having a radiation prevention film omission section 7 with an omission ratio of 20% had a superior temperature maintaining property up to 1 hour from the start of the test compared with the thermally insulated container having an omission ratio of 0%.
(4) The thermally insulated container comprising a radiation prevention film 5 having a radiation prevention film omission section 7 with an omission ratio of 30% has a superior temperature maintaining property up to 30 minutes from the start of the test compared with the thermally insulated container having an omission ratio of 0%.
(5) The thermally insulated container of Test Example 1 in which the thermally insulating layer V was formed using a low thermal conductivity gas had a superior temperature maintaining property compared with the thermally insulated container of Test Example 2 in which the thermally insulating layer V was formed using air.

From these results (1) to (5), it is possible to make the following observations.

Compared with a case in which the radiation prevention film 5 is formed over the entirety of the outer surface 2b of the inner container, for a thermally insulated container 1 in which a radiation prevention film omission section 7 is formed, it is possible increase the temperature maintaining property of the thermally insulated container 1.

In addition, even when the surface area of the radiation prevention film omission section 7 is comparatively large, it is possible for superior temperature maintaining properties to be exhibited in the short term.

For this reason, the surface area of the radiation prevention film omission section 7 can be set in accordance with the required temperature maintenance time.

TEST EXAMPLE 2

Thermally insulated glass vacuum containers as shown in FIG. 1 were manufactured in the following way.

Inner and outer containers 2 and 3 as used in Test Example 1 were thoroughly washed. Thereafter, as a masking material, oil was applied to the outer surface 2b of the inner container, and to the inner surface 3b of the outer container in the axial direction of the container.

Next, the inner and outer containers 2 and 3 were joined to form a double walled container. Then, the outer wall 2b of the inner container and the inner wall 3b of the outer container were chemically plated using a silver mirror reaction.

As a result, the masked sections (the sections to which oil was applied) formed the radiation prevention film omission sections 7, and radiation prevention films 5 were formed by forming silver plating films on sections other than the masked sections.

Next, after the space 4 was vacuum evacuated via the tip tube 6 for evacuation, the tip tube 6 for evacuation was sealed by welding, and thermally insulated containers 1 were obtained. The ratios (the omission ratios) of the surface areas of these radiation prevention film omission sections 7 to the surface area of the outer surface 2b of the inner container were 5%, 10%, 20%, and 30%.

In addition, a thermally insulated container in which a radiation prevention film 5 was not formed (omission ratio of 100%), and a thermally insulated container in which a radiation prevention film omission section 7 was not formed in the radiation prevention film 5 (omission ratio of 0%) were manufactured. The The same evaluation test for temperature maintaining performance as was carried out in Test Example 1 was carried out on these six containers.

The results confirmed that the pattern of change in temperature over time of the water within these six thermally insulated containers having omission ratios from 0 to 100% is similar to the pattern of change in temperature over time of the water within the six thermally insulated containers having omission ratios from 0 to 100% in Test Example 1, respectively.

INDUSTRIAL APPLICABILITY

In the thermally insulated container of the present invention, since the radiation prevention film has a radiation prevention film omitted section, it is possible to check the contents within the inner container through the radiation prevention film omission section. For this reason, when checking the contents, it is not necessary to open the opening by removing the lid or the like, and it is possible to prevent changes in the temperature of the contents due to external air.

In addition, when compared with a thermally insulated container having a radiation prevention film in which a radiation prevention film omission section is not formed, the thermally insulated container can increase thermal insulation performance. Consequently, it is possible to improve the temperature maintaining properties.

By means of forming the radiation prevention film omission section in a slit shape in the axial direction of the container, irrespective of the position of the axial direction of the container (for example, the position of the height of the surface of the liquid), it is possible to check the contents. Consequently, irrespective of the quantity of the contents, it is possible to check the contents and the amount thereof with certainty.

In addition, in the thermally insulated container of the present invention, since it is possible to form the radiation prevention film by means of a chemical plating method, a vapor deposition method, or the like, it is possible to form the radiation prevention film even when the surfaces of the container are curved. Consequently, it is possible to increase the radiation prevention function and to obtain superior temperature maintaining properties.

What is claimed is:

1. A thermally insulated container comprising an inner container and an outer container formed of a transparent material arranged leaving a space section therebetween, and integrally joined to form a double walled container, wherein
    the space section between the inner container and the outer container of the double walled container forms a thermally insulating layer,
    a radiation prevention film is formed on at least one of an outer surface of the inner container and an inner surface of the outer container, and
    the radiation prevention film has a radiation prevention film omission section having a surface area which is 30% or less of the surface of the container on which the radiation prevention film is formed.

2. A thermally insulated container according to claim 1, wherein the transparent material is glass.

3. A thermally insulated container according to claim 1, wherein the transparent material is synthetic resin.

4. A thermally insulated container according to claim 1, wherein the thermally insulating layer is a vacuum insulation layer.

5. A thermally insulated container according to claim 1, wherein the thermally insulating layer encloses a low thermal conductivity gas.

6. A thermally insulated container according to claim 1, wherein the radiation prevention film omission section is formed in a slit shape in the axial direction of the container.

* * * * *